W. M. Henry. Bee Hive.

No. 117,539

Patented Aug. 1 1871.

Witnesses:
A. Bennekendorf
Wm. H. C. Smith

Inventor:
W. M. Henry
per [signature]
Attorneys.

UNITED STATES PATENT OFFICE.

WILLIAM M. HENRY, OF LEO, INDIANA.

IMPROVEMENT IN BEE-HIVES.

Specification forming part of Letters Patent No. 117,539, dated August 1, 1871.

*To all whom it may concern:*

Be it known that I, WILLIAM M. HENRY, of Leo, in the county of Allen and State of Indiana, have invented a new and useful Improvement in Bee-Hive; and I do hereby declare that the following is a full, clear, and exact description thereof, which will enable others skilled in the art to make and use the same, reference being had to the accompanying drawing forming part of this specification.

This invention relates to a new and useful improvement in bee-hives; and consists in the arrangement of the frames, hereinafter described.

Figure 1:
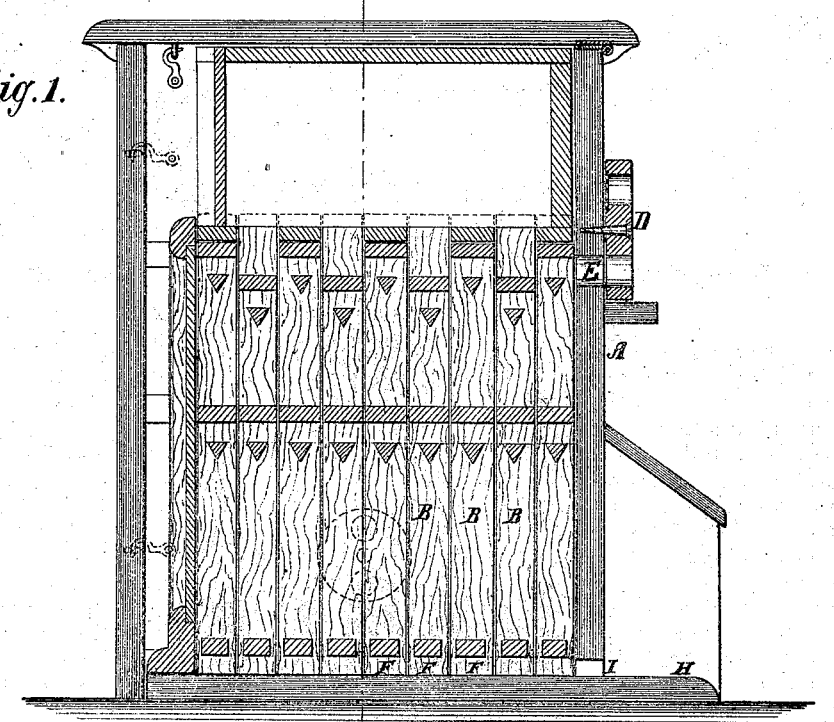
Figure 2:
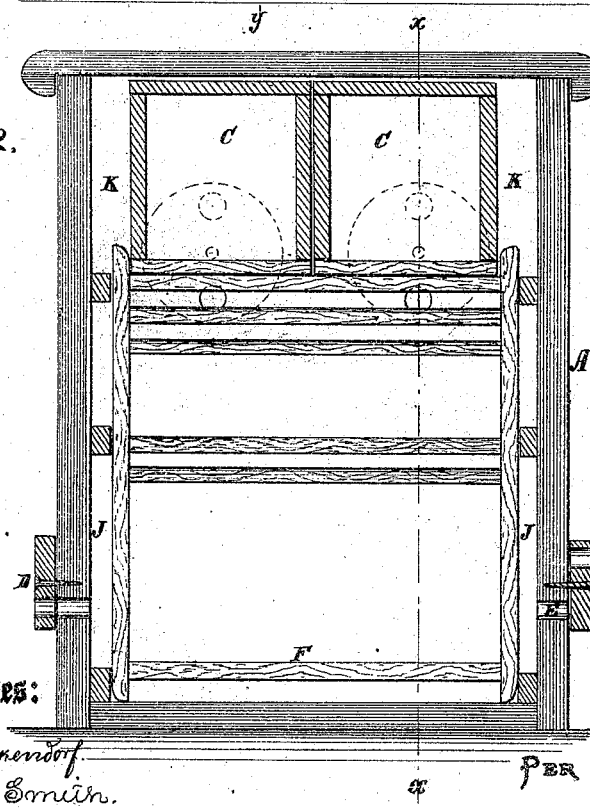

In the accompanying drawing, Figure 1 represents a vertical section of the hive taken on the line $x$ $x$ of Fig. 2. Fig. 2 is a vertical section taken on the line $y$ $y$.

Similar letters of reference indicate corresponding parts.

A is the hive, made of wood, and of suitable size and proportion, one side of which is hinged and swings open so as to expose the interior and allow of the removal of the honey-frames and boxes. The top of the hive is also hinged, and is fastened down by hooks, as seen in the drawing. B are the honey-frames; C, the honey-boxes. D represents ventilators, which revolve on central screw-pivots, each having one or more orifices which register with fly-holes E, which ventilators are made (by turning or revolving them) to either allow the bees to pass through, or in and out, or close the holes. The ventilators in the upper portion of the hive have a screened orifice, which allows air to enter, but excludes the bee. The friction of the ventilator on the outside of the hive is sufficient to hold it in any desired position. The honey-frames B are made with double-beveled cross-bars, as seen in the drawing, and placed side by side in an upright position. The lower cross-rails F of each of the frames is narrower than the uprights, as seen in Fig. 1, and the upper cross-rails of every alternate frame are dropped down, as seen in the same figure, which allows a free passage upward between the frames not only for the bees but for ventilation. The honey-boxes have slat bottoms through which the bees gain entrance to them. By dropping down the upper cross-slats of every other frame the bees, the heat, and the air are allowed free access to the honey-boxes. H is the entrance-platform, and I is the main bee-entrance. J represents air-spaces between the sides of the hive and the honey-frames. Outside of the honey-boxes there are also open spaces, as seen at $k$ $k$.

The slats of the bottoms of the honey-boxes correspond with and cover the top rails of the alternate frames. The bees by this arrangement are prevented from attaching the comb formed in the honey-boxes to the rails of the frames. The hive is so ventilated and the frames are so constructed and arranged with regard to each other that free access is given to every portion of the hive, and the interior is kept at an even temperature.

Having thus described my invention, I claim as new and desire to secure by Letters Patent—

The arrangement of the frames B, or dropping down the upper rail of each alternate frame, substantially as and for the purposes shown and described.

WILLIAM M. HENRY.

Witnesses:
JOHN B. MAGER,
C. KNORR.